(12) United States Patent
Hepp et al.

(10) Patent No.: US 11,199,826 B2
(45) Date of Patent: Dec. 14, 2021

(54) FIELD DEVICE FOR DETERMINING A PROCESS VARIABLE IN PROCESS AUTOMATION

(71) Applicant: Siemens Aktiengesellschaft, Munich (DE)

(72) Inventors: Joachim Hepp, Karlsbad (DE); Adrian Mucha, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 408 days.

(21) Appl. No.: 16/096,154

(22) PCT Filed: Apr. 28, 2017

(86) PCT No.: PCT/EP2017/060168
§ 371 (c)(1),
(2) Date: Oct. 24, 2018

(87) PCT Pub. No.: WO2017/186900
PCT Pub. Date: Nov. 2, 2017

(65) Prior Publication Data
US 2019/0137963 A1 May 9, 2019

(30) Foreign Application Priority Data

Apr. 28, 2016 (DE) .................. 102016207289.7

(51) Int. Cl.
*G05B 19/048* (2006.01)
*G05B 19/401* (2006.01)
*G05B 19/4105* (2006.01)

(52) U.S. Cl.
CPC ......... *G05B 19/048* (2013.01); *G05B 19/401* (2013.01); *G05B 19/4105* (2013.01); *G05B 2219/25428* (2013.01)

(58) Field of Classification Search
CPC ............... G05B 19/048; G05B 19/401; G05B 19/4105; G05B 19/25428
See application file for complete search history.

(56) References Cited

U.S. PATENT DOCUMENTS

2005/0268166 A1 12/2005 Muth
2010/0164717 A1* 7/2010 Hammer ............ G05B 19/0425
340/540
2012/0290882 A1 11/2012 Corkum

FOREIGN PATENT DOCUMENTS

DE 2522974 A1 * 1/1977 ......... H02K 15/0043
DE 10225556 12/2003
(Continued)

OTHER PUBLICATIONS

PCT International Search Report based on PCT/EP2017/060168 dated Apr. 28, 2017.

*Primary Examiner* — Tarun Sinha
*Assistant Examiner* — Lal C Mang
(74) *Attorney, Agent, or Firm* — Cozen O'Connor

(57) ABSTRACT

A field device which outputs a measured value and includes a self-diagnosis function which, when at least one specified error is detected, signals this error, marks the output measured value as temporarily invalid, and initiates the output of a substitute value that is used to trigger a safety-oriented response, where to prevent interventions when temporary errors occur, but without losing safety-relevant information, the field device includes a first and second timers having different expiration times that are started when the error is detected and are reset at the end of the detected error, where the first timer initiates the output of the substitute value when the first expiration time expires, where the second timer signals the error when the second expiration time (Continued)

expires, and where the signal is resettable if, at the same time, the output measured value is marked as valid via the second binary status signal.

2 Claims, 2 Drawing Sheets

(56) References Cited

FOREIGN PATENT DOCUMENTS

| | | |
|---|---|---|
| DE | 102007026244 | 12/2008 |
| DE | 102012223706 | 6/2014 |
| EP | 2522974 | 11/2012 |

\* cited by examiner

FIELD DEVICE FOR DETERMINING A PROCESS VARIABLE IN PROCESS AUTOMATION

CROSS-REFERENCE TO RELATED APPLICATIONS

This is a U.S. national stage of application No. PCT/EP2017/060168 filed Apr. 28, 2017. Priority is claimed on German Application No. 102016207289.7 filed Apr. 28, 2016, the content of which is incorporated herein by reference in its entirety.

BACKGROUND OF THE INVENTION

1. Field of the Invention

The invention relates to a field device for determining a process variable in process automation, having a sensor for detecting and converting the process variable into an electrical measuring signal, an evaluation facility for processing the measuring signal to form a measured value, an output facility for outputting the measured value, and a diagnostic facility for monitoring the function of the field device and generating and outputting binary status reports, where the diagnostic facility is configured to report at least one predetermined error by way of a first binary status report upon detection of the same, to identify the output measured value as temporarily invalid via a second binary status report and/or to trigger the output facility to output a replacement value instead of the measured value.

2. Description of the Related Art

EP 2 153 288 B1 discloses a conventional field device.

In process-engineering plants, locally distributed decentralized field devices (process devices) perform predetermined functions within the scope of plant or process automation and in doing so exchange process-, plant- and/or device-relevant information with higher-level components of the automation system, in particular its management system or engineering system. Measuring transducers for pressure, temperature, flow rate, fill level etc. and analysis devices for gas or liquid analysis are among the field devices that detect process variables within the scope of their function. A sensor, which may be very simple, for instance, in the case of a temperature measuring transducer and may be comparatively complex in the case of absorption spectrometers, detect a process variable, here in other words the temperature or a wavelength-specific light absorption, and convert this into an electrical measuring signal. The measuring signal (raw signal) obtained directly firstly undergoes analog processing, e.g., is filtered and amplified, and then further processed digitally to form a measured value, e.g., a temperature measured value or a concentration measured value of a specific gas component. The measured value can be output in digital or analog form, where in the latter case a voltage signal or a current signal that is proportional to the measured value is generated, typically in the range of 4 to 20 mA.

In order to be able to use field devices in the field of functional safety (SIL), errors that may lead to an invalid measured value must be identified and reported. For this purpose, the field device performs self-monitoring and diagnostics. Errors can be reported and output measured values can be identified as temporarily invalid by outputting binary status reports. Furthermore, in the event of an error, a replacement value can be output instead of the measured value, where the replacement value is outside of the measured value range and serves as a safety signal for automatically triggering automatic counter measures. Such emergency measures may even extend to switching off plants and plant parts.

SUMMARY OF THE INVENTION

It is therefore an object of the invention to prevent serious interventions in a process cycle when temporary errors occur, without safety-relevant information getting lost.

This and other objects and advantages are achieved in accordance with the invention by a field device in which the diagnostic facility contains a first timer with a predetermined first expiration time and a second timer with a predetermined second expiration time, the second expiration time is shorter than the first expiration time, both timers are started upon detection of the error and are reset at the end of the detected error, the first timer triggers the output of the replacement value when the first expiration time has elapsed, and in which the second timer reports the error via the first binary status report when the second expiration time has elapsed, where the report can be reset by an acknowledgment signal at a point in time at which the diagnostic facility identifies the output measured value as valid via the second binary status report.

In the event of an error, the measured value is output for as long as possible within the scope of a response time predetermined by the expiration time of the first timer. If the error disappears again within the reaction time, then the process can proceed further without interference or interruption. The information that an error has occurred does not get lost for the user, however. The expiration times of the two timers can be configured and thus adjusted to the safety requirement of the plant.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

To further explain the invention, reference is made below to the figures in the drawings, in which.

DETAILED DESCRIPTION OF THE EXEMPLARY EMBODIMENTS

Figure 1:
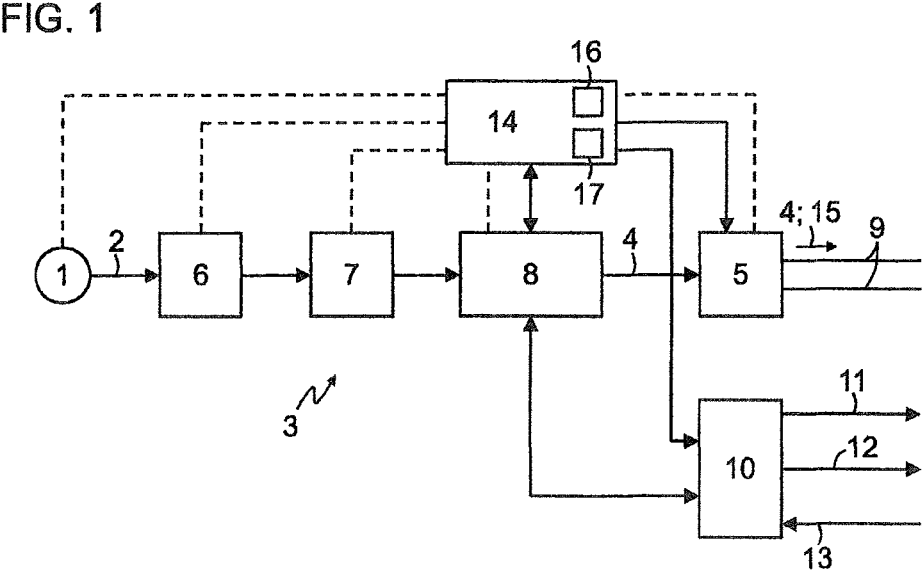
FIG. 1 is a schematic illustration of an exemplary embodiment of the inventive field device.

FIG. 1 shows, in the form of a simplified block diagram, a field device with a sensor 1, here in the form of an individual sensor, which detects a process variable, such as pressure, and converts it into an electrical measuring signal (raw signal) 2. The measuring signal 2 is prepared in a signal processing facility 3 for technical measurement purposes and is processed to form a measured value 4 which is output via an output facility 5. In the exemplary illustrated embodiment, the signal processing comprises an analog signal preparation 6, e.g., equalization, filtering and preamplification, an analog/digital conversion 7 and a digital microprocessor-controlled signal processing 8, which generates the measured value 4. Here, the output facility 5 outputs the measured value 4, here in the form of a 4 to 20 mA current signal, on a two-wired line 9. A digital input and output unit 10 that communicates with the digital signal processing facility 8 has two binary outputs for outputting a first and second binary status report 11, 12 and a binary input for inputting an acknowledgment signal 13.

The function of the field device is monitored by a diagnostic facility 14, which distinguishes between serious errors, which practically represent a device failure (e.g., program flow errors, RAM errors, errors of the 4 to 20 mA current signal), and less critical errors (excessive internal temperatures within the device, temporary failure of the device-internal communication). When an error is detected, the diagnostic facility 14 identifies the output measured value 4 as invalid via the second binary status report 12. If a serious error occurs, then the output facility 5 is triggered immediately to output a replacement value 15 of less than 3.6 mA or greater than 21 mA instead of the measured value 4. The error itself is reported via the first binary status report 11. If a less critical error occurs, then the output of both the replacement value 15 and the report of the error are delayed. For this purpose, the diagnostic facility 14 contains a first timer 16 with a predetermined first expiration time and a second timer 17 with a predetermined second expiration time.

Depending on whether the detected error is a serious error or a less serious error, the diagnostic facility 14 triggers the output facility 5 to output a replacement value 15 of less than 3.6 mA or greater than 21 mA immediately or after a delay, instead of the measured value 4, to report the error via a first binary status report 11 and to identify the output measured value 4 as temporarily invalid via the second binary status report 12.

Figure 2:
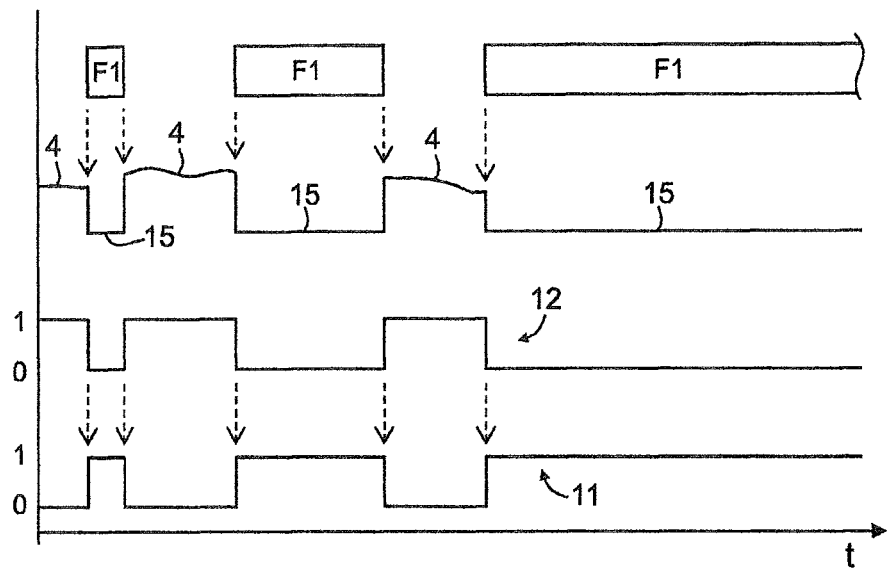
FIG. 2 is a graphical plot illustrating an exemplary response of the field device with a serious error.

FIG. 2 shows an example, in which a serious error F1 occurs repeatedly during the course of time t, where the duration of the error F1 increases from very short to short to medium or to long. Each time the serious error F1 occurs, a replacement value 15 of 3.6 Ma, for instance, is output instead of the analog measured value 4 between 4 and 20 mA. The second binary status report 12, which indicates the validity of the output measured value 4 with a logical "one", assumes the logical state "zero" and thus identifies the measured value 4. The first binary status report 11 reports the errors F1 with a logical "one".

Figure 3:
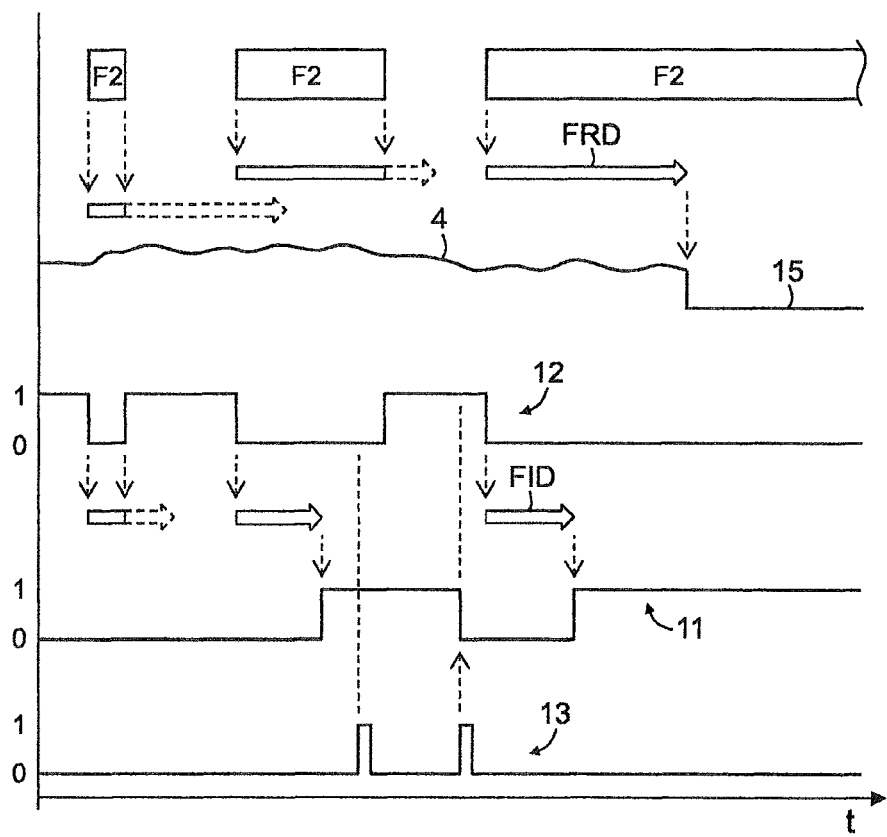
FIG. 3 is a graphical plot illustrating an exemplary response of the field device with a less serious error.

FIG. 3 shows an example in which a less serious error F2 is detected during the course of time t instead of the serious error F1, where the duration of the error F2 also increases here from very short to short to medium or to long. As with the occurrence of a serious error F1, with the less serious error F2 the output measured value 4 is also identified as invalid during the error duration via the second binary status report 12. There is, however, no immediate output of a replacement value 15 and also no immediate error report via the first binary status report 11. Instead, each time the error F2 occurs, the first timer 16 is started with the first expiration time FRD (fault reaction delay) and the second timer 17 is started with the second expiration time FID (fault indication delay) and is reset at the end of the detected error F2. The expiration times FRD, FID can be configured, where the second expiration time FID is essentially shorter than the first expiration time FRD. In the example shown, the duration of the very short error F2 is shorter than both expiration times FRD, FID so that both timers 16, 17 are reset early. The duration of the subsequent short error F2 lies between the expiration times FRD and FID so that only the timer 16 is reset at the end of the error. The second timer 17 has, however, already previously elapsed and reports the error via the first binary status report 11 with a logical "one". This report, i.e., the logical "one", remains until it is reset by an acknowledgment signal 13 generated by the user. The resetting is only effective if no error is present at this point in time. If, by contrast, the duration of the error F2 exceeds both expiration times FRD and FID, then the first timer 16 triggers the output of the replacement value 15 when the first expiration time FRD has elapsed.

Very short errors F2, the durations of which are shorter than both expiration times FRD, FID, are therefore ignored. Short errors F2, the durations of which are shorter than the first expiration time FRD and longer than the second expiration time FID, are reported via the first binary status report 11 but in the case of an error-free device status can be acknowledged by the user. All errors persisting over a prolonged duration are reported by way of the first binary status report 11 and result in the replacement value 15 being output.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A field device for determining a process variable in process automation, comprising:
   a sensor for detecting and converting the process variable into an electrical measuring signal;
   an evaluation facility for processing the measuring signal to form a measured value;
   an output facility for outputting the measured value; and
   a diagnostic facility for monitoring a function of the field device and generating and outputting binary status reports, the diagnostic facility being configured to report at least one predetermined error, upon detection of the least one predetermined error, via a first binary status report, to at least one of (i) identify the output measured value as temporarily invalid via a second binary status report or (ii) trigger the output facility to output a replacement value instead of the measured value;
   wherein the diagnostic facility includes a first timer with a predetermined first expiration time and a second timer with a predetermined second expiration time;
   wherein the second expiration time is shorter than the first expiration time;

wherein the first and second timers are started upon detection of the error and are reset at an end of the detected error;

wherein the first timer triggers the output of the replacement value when the first expiration time has elapsed;

wherein the second timer reports the error via the first binary status report when the second expiration time has elapsed; and wherein the report is resettable by an acknowledgment signal at a point in time at which the diagnostic facility identifies the output measured value as valid via the second binary status report.

2. The field device as claimed in claim 1, wherein the output facility is configured to output the measured value as an analog output signal.

* * * * *